US009439540B2

(12) United States Patent
Berry

(10) Patent No.: US 9,439,540 B2
(45) **Date of Patent: *Sep. 13, 2016**

(54) POTATO CHIP LIFTER

(71) Applicant: Donald P. Berry, Debary, FL (US)

(72) Inventor: Donald P. Berry, Debary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,399

(22) Filed: Nov. 7, 2015

(65) Prior Publication Data

US 2016/0058248 A1 Mar. 3, 2016

Related U.S. Application Data

(63) Continuation-in-part of application No. 14/451,956, filed on Aug. 5, 2014, now Pat. No. 9,277,842, which is a continuation-in-part of application No. 14/206,921, filed on Mar. 12, 2014, now Pat. No. 9,173,526.

(51) Int. Cl.
*A47J 43/28* (2006.01)

(52) U.S. Cl.
CPC .................................... *A47J 43/28* (2013.01)

(58) Field of Classification Search
CPC .............................. B65D 83/005; A47J 43/28
USPC ............ 294/173, 12, 26, 175, 26.5, 32, 219, 294/53.5; 215/391; 206/804; 221/279
See application file for complete search history.

(56) References Cited

U.S. PATENT DOCUMENTS

| | | | | |
|---|---|---|---|---|
| 1,028,872 | A | 6/1912 | Fryckberg | |
| 2,876,930 | A | 3/1959 | Will | |
| 2,904,205 | A | 9/1959 | Callery | |
| 3,249,250 | A | 5/1966 | McKee | |
| 3,498,798 | A | 3/1970 | Baur et al. | |
| 5,082,135 | A | 1/1992 | DeCoster | |
| 5,382,065 | A | 1/1995 | Snell | |
| 6,036,038 | A | 3/2000 | Lovelace et al. | |
| 6,578,344 | B1 | 6/2003 | Fluck | |
| 6,745,918 | B2 | 6/2004 | Greene | |
| 7,487,878 | B2 | 2/2009 | Giwargis et al. | |
| 7,556,167 | B2 | 7/2009 | Giwargis et al. | |
| 9,173,526 | B2 * | 11/2015 | Berry | A47J 43/28 |
| 2008/0110881 | A1 | 5/2008 | Schulz et al. | |
| 2009/0050584 | A1 | 2/2009 | Muhlbaier | |
| 2009/0188936 | A1 | 7/2009 | Marando | |
| 2010/0127261 | A1 | 5/2010 | Yamazaki | |
| 2012/0000884 | A1 | 1/2012 | Adi | |

* cited by examiner

*Primary Examiner* — Dean Kramer
(74) *Attorney, Agent, or Firm* — Michael L. Leetzow, P.A.

(57) ABSTRACT

A potato chip lifting apparatus has a elongated handle with a front side and a back side, the back side having a plurality of catching mechanisms extending from the back side of the elongated handle and away from the elongated handle, the catching mechanisms configured to engage a can in which potato chips are stored. A foot portion is removably and rotatably attached to a bottom portion of the elongated handle, the foot portion movable between a first position and a second position, in the second position the foot portion extends in a direction away from the front side of the handle and generally orthogonal to the elongated handle and the front side thereof.

19 Claims, 23 Drawing Sheets

POTATO CHIP LIFTER

This application is a continuation-in-part application of application Ser. No. 14/451,956, filed on Aug. 5, 2014, still pending, which is a continuation-in-part application of U.S. Pat. No. 9,173,526, issued on Nov. 3, 2015, the contents of both are hereby incorporated by reference in their entirety.

BACKGROUND OF THE INVENTION

Field of the Invention

The present invention is directed to an apparatus that may be inserted into a potato chip can before or after the potato chips are loaded into the potato chip can.

There are many ways to package and ship potato chips. The potato chips are packaged in bags, foil bags, recyclable bags, and cans. The potato chips in the bags are easy to retrieve by a potato chip eater. To get to the bottom of the container, the eater only needs to open the bag all the way. However, when the preformed chips are shipped in elongated cylindrical cans, it can be difficult to retrieve the chips once the first couple of inches of chips have been eaten. The eater can turn the can over or onto its side to get the remaining chips. However, the eater runs the risk of dumping pieces of broken chips all over one's self or into the surroundings. There are lifting mechanisms that are placed into the can before the chips are inserted and the can sealed. While these may be useful, it does not help with the cans that have no mechanism and they can not be added by the consumer later. Additionally, the preinstalled lifting mechanisms add weight to the can, thereby increasing the shipping costs. The preinstalled lifting mechanisms also make it more difficult to load the chips and can increase the number of broken potato chips. Therefore, a potato chip lifter than can be inserted into the potato chip can after it is purchased is needed.

SUMMARY OF THE INVENTION

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
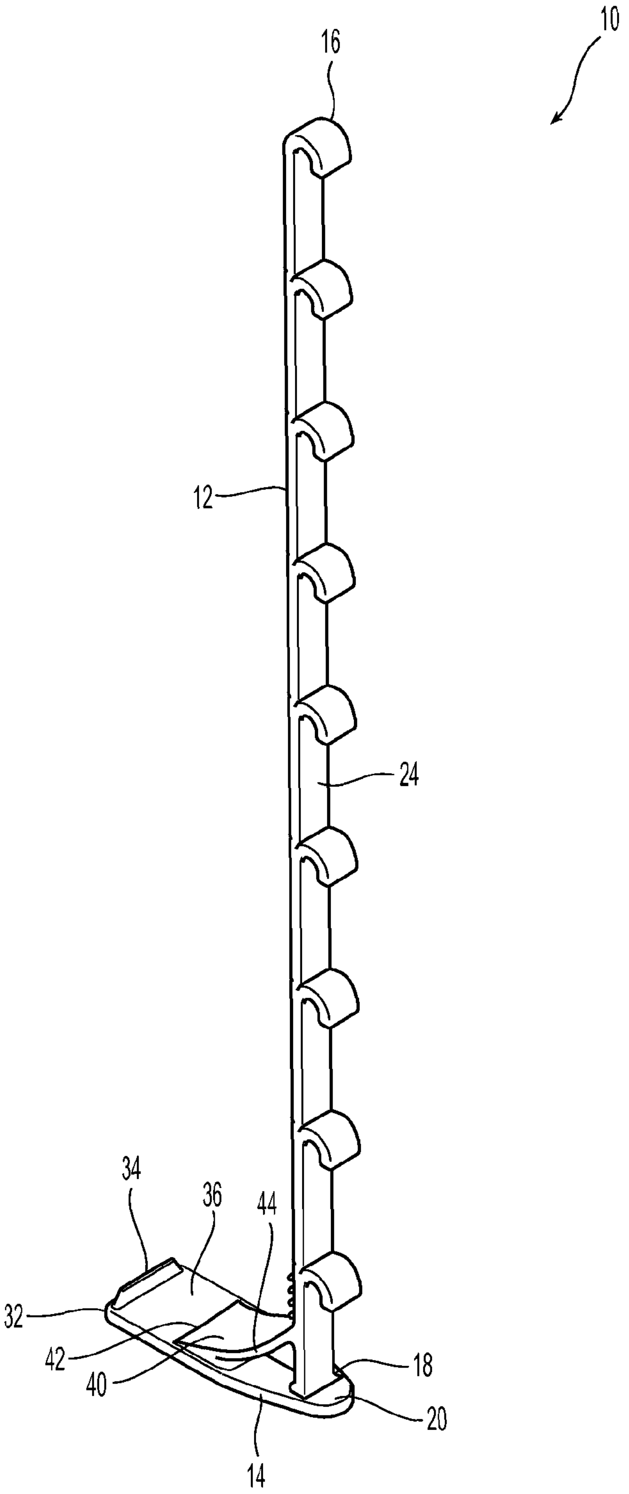
FIG. 1 is a rear perspective of one embodiment of a potato chip lifter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
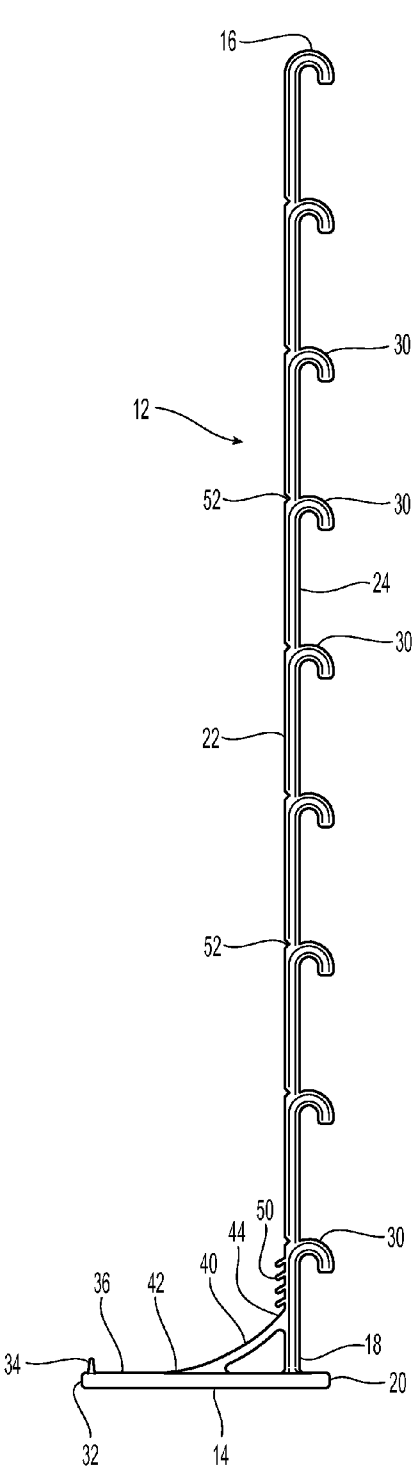
FIG. 2 is a right side elevational view of the potato chip lifter of FIG. 1.
Figure 3:
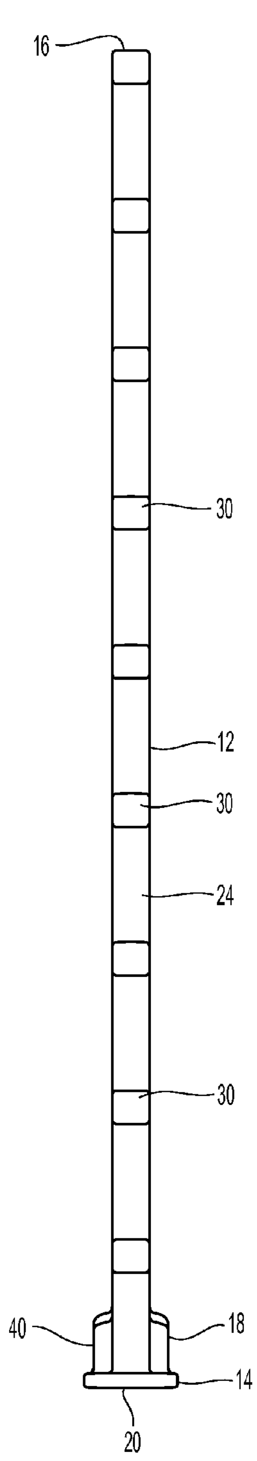
FIG. 3 is a rear side elevational view of the potato chip lifter of FIG. 1.

Referring to FIGS. 1-3, one embodiment of a potato chip lifter 10 has an elongated handle 12 and a foot portion 14. The potato chip lifter 10 is preferably a unitary element that is all formed as a single unit, but it could be made in pieces and connected together, by ultrasonic welding or another technique as is known in the art. The elongated handle 12 has a top end 16 and a bottom end 18 that connects with the back end 20 of the foot portion 14. The elongated handle 12 also has a front side 22 and a back side 24. Extending from the back side 24 are catching mechanisms 30. The catching mechanisms 30 are preferably spread along the elongated handle 12 at equal spacing. The catching mechanisms 30 are preferably inverted U-shaped members that engage the edge of a can. See FIG. 8. While the catching mechanisms 30 are illustrated as inverted U-shaped members, they may have any relevant shape (e.g., inverted V-shape, see also FIGS. 9 and 10) and still fall within the scope of the present invention.

The foot portion 14 is attached to the elongated handle 12 at the bottom 18 thereof. The foot portion 14 is preferably an elongated flat member having a front end 32 and a back end 20. The foot portion 14 is preferably attached to the elongated handle 12 at about 90°, although other angles could be used and fall within the scope of the present invention. The front end 32 of the foot portion 14 is preferably wider than the back end 20, the foot portion 14 tapering in its width about one third of the way from the back end 22 to the front end 32. The front end 32 of the foot portion 14 may also be pointed to assist in moving under the potato chips. Adjacent the front end 32 is a support 34 extending upward from a top surface 36 of the foot portion 14. The support 34 extends upward in a parallel direction to the elongated handle 12 and orthogonal to the top surface 36 to support potato chips resting on the potato chip lifter 10. See FIG. 4. The support 34 assists in keeping the chips on the potato chip lifter 10.

The potato chip lifter 10 also has a stability element 40. The stability element 40 is connected to the foot portion 14 at the front side 42 of the stability element 40 and to the elongated handle 12 at the back side 44 of the stability element 40. The stability element 40 may also provide support and guidance to the stack of chips (see FIG. 7 after the potato chip lifter 10 has been inserted into the can of chips and is used to lift the stack of chips.

Figure 4:
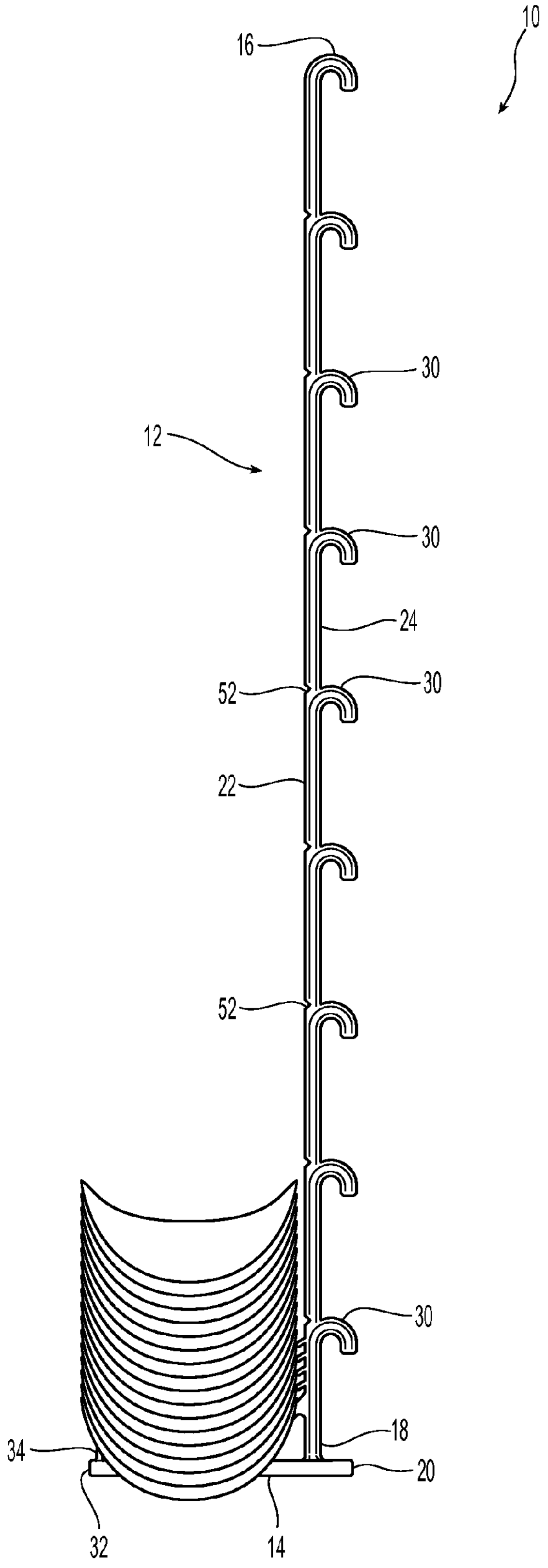
FIG. 4 is right side elevational view of the potato chip lifter of FIG. 1 with some potato chips.

The elongated handle 12 also has a plurality of guides 50 adjacent the back side 44 of the stability element 40. The plurality of guides 50 project from the front side 22 of the elongation handle 12, and preferably in a downward direction toward the foot portion 14. The guides 50 can engage the edges of the chips in the stack and prevent them from rotating, as illustrated in FIG. 4, in a counterclockwise direction and fall off the front end 32 thereof. While four of the guides 50 are illustrated in the figures, it is possible to have more or fewer of the guides 50 and still come within the scope of the present invention.

Beginning directly above the guides 50 are also a plurality of thinned areas or scored areas 52. These scored areas 52 provide breaking points for the user if so desired. As can be realized, as the chips are taken from the top of the stack, and the stack gets shorter, the user must lift the potato chip lifter 10 higher in the can. Thus, more of the potato chip lifter 10 will extend above the top edge of the can. See FIG. 8. Because the length of the potato chip lifter 10 may get in the way of the user, the user can break off sections of the elongated handle 12 at the scored areas 52.

Figure 5:
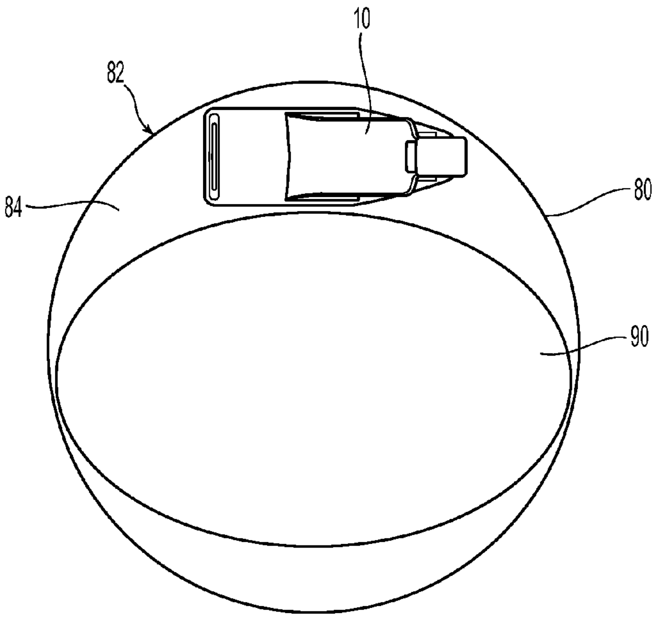
FIG. 5 is a top view of the potato chip lifter of FIG. 1 being inserted into a can of potato chips and passing between the can and the potato chips.
Figure 6:
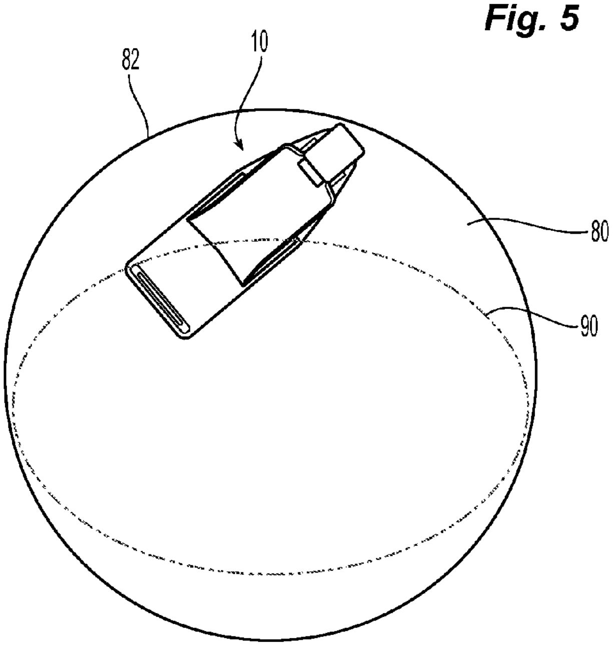
FIG. 6 is a top view of the potato chip lifter moving in the can from the inserted position to the lifting position.

Turning now to FIGS. 5 and 6, the potato chip lifter 10 is inserted into the can 80 between the stack of chips 90 and the wall 82 of the can 80. As illustrated in FIG. 5, the stack of chips 90 can be moved relative to the can 80. In this figure, the can 80 has been turned on its side so that the stack of chips 90 is lying on its side. The potato chip lifter 10 has been inserted into the space 84 created in the can 80. The potato chip lifter 10 is sized to fit within the space 84. Once the potato chip lifter 10 hits the bottom of the can 80, the potato chip lifter 10 is rotated to pass under the bottom chip in the stack of chips 90. The can 80 can be tilted or otherwise oriented to allow the potato chip lifter 10 to pass under the bottom chip in the stack 90. The resulting position is illustrated in FIG. 7.

Figure 8:
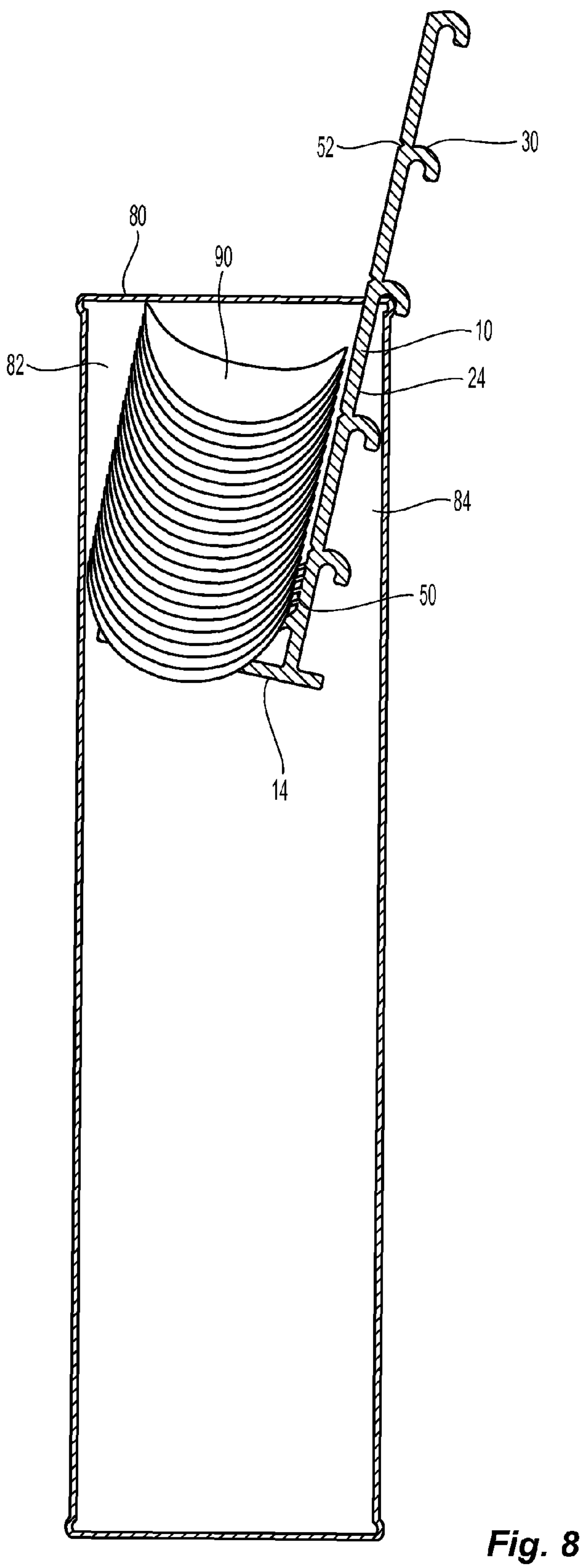
FIG. 8 is a cross section view of the potato chip lifter in the can lifting the chips, the catching mechanisms engaging the side of the can, and the chip lifter truncated.

As the person eating the chips eats more of the chips, the potato chip lifter 10 is used to move the stack of chips 90 upward so the person can access the chips without turning the can on its side or over, and having pieces of the chips fall onto them. As noted above, as the stack becomes smaller, the more of the elongated handle 12 extends out of the can 80, as illustrated in FIG. 8. The user can, use the catching mechanisms 30, engage the elongated handle 12 on the wall 82 of the can 80 and hold the stack of potato chips 90 toward the top of the can 80 so the chips can be easily retrieved. The catching mechanisms 30 can be fewer or more and have different spacings than that illustrated in the figures. Moreover, the catching mechanisms 30 can also be longer and extend at different angles, depending on the preference of the user and the space 84 in the can. See FIG. 9.

Figure 7:
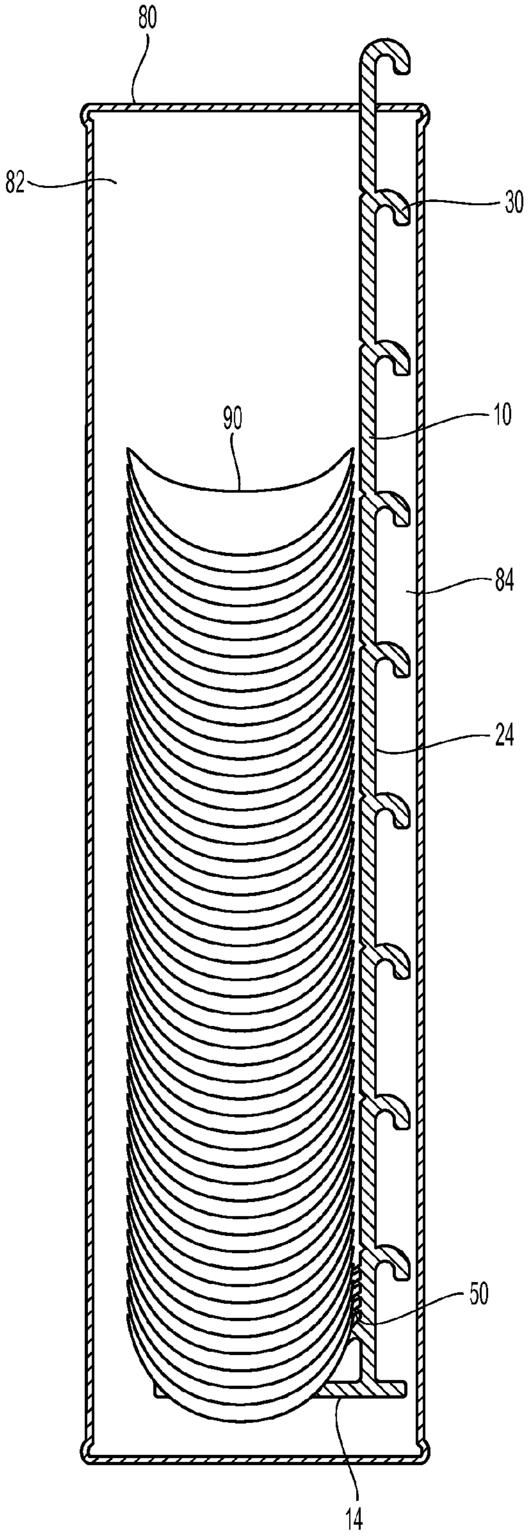
FIG. 7 is a cross section view of the potato chip lifter in the can ready to lift the chips.

It should be noted that while this invention can be used for those chips and cans after they have been packaged, a packing company could also include the potato chip lifter 10 in the space 84 between the stack 90 and the can 80, or in the usable configuration as illustrated in FIG. 7.

Figure 9:
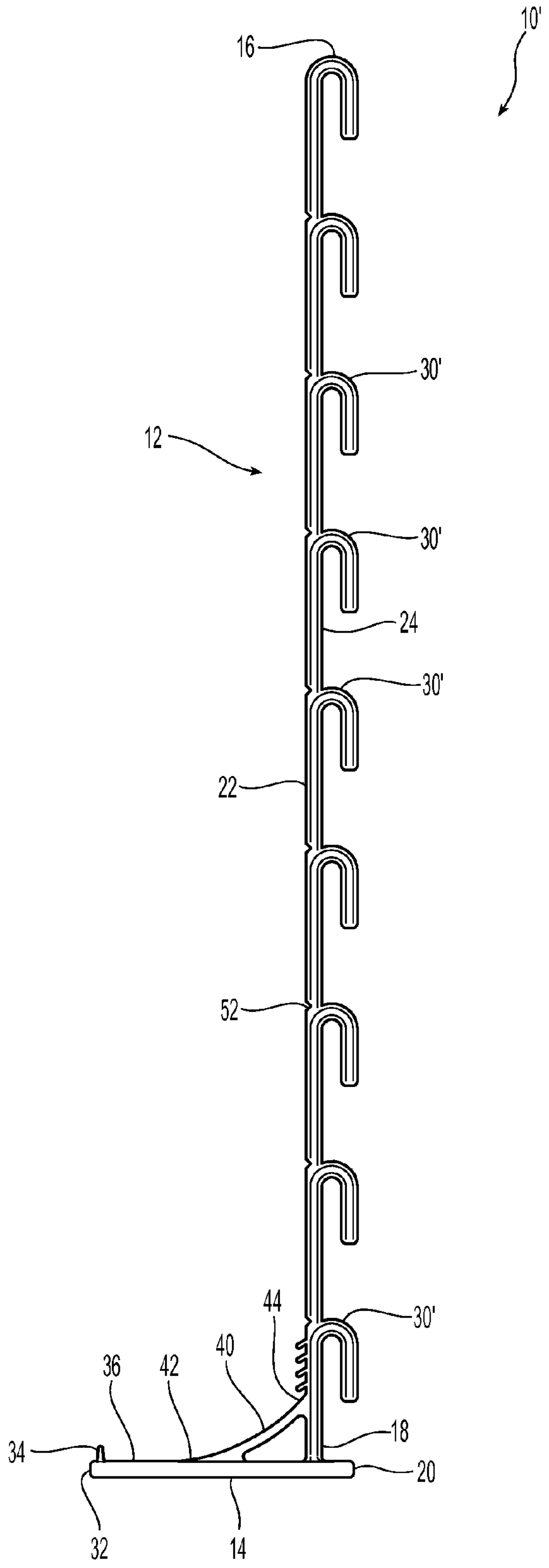
FIG. 9 is a side elevational view of a second embodiment of a potato chip lifter according the present invention.

An alternative embodiment of a potato chip lifter 10' as illustrated in FIG. 9 has an elongated handle 12 and a foot portion 14. The potato chip lifter 10' is similar to the first embodiment, but has catching mechanisms 30'. The catching mechanisms 30' are preferably spread along the elongated handle 12 at equal spacing. The catching mechanisms 30' are preferably inverted U-shaped members that are longer than the previous embodiment.

Figure 10:
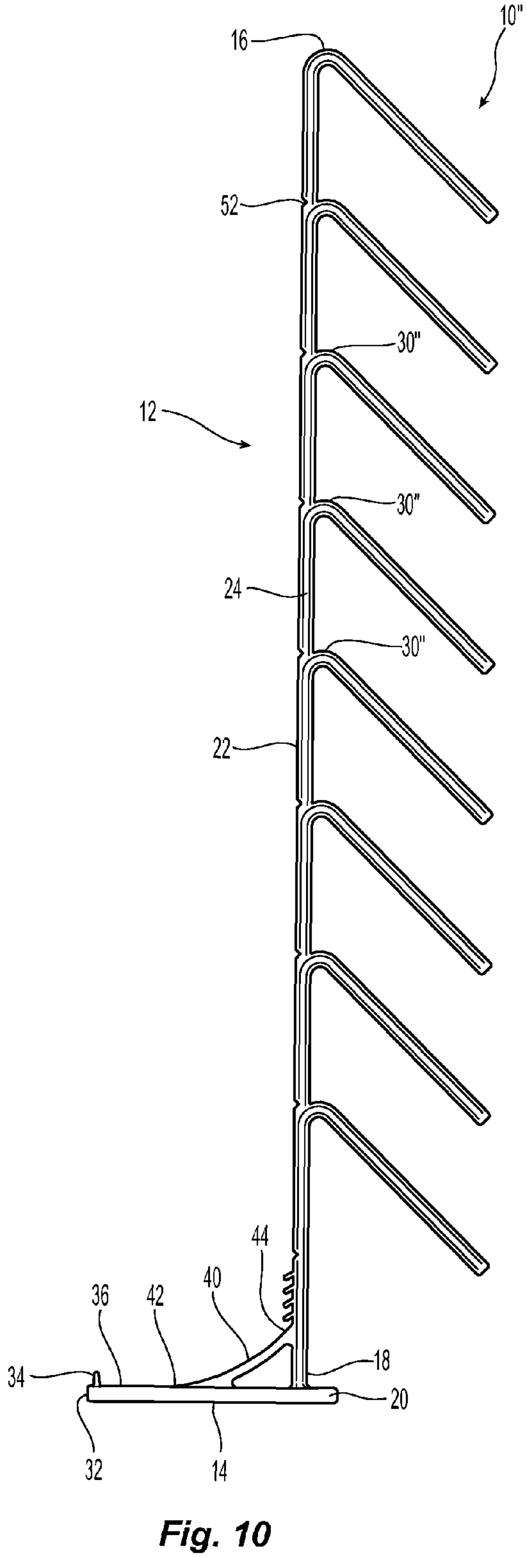
FIG. 10 a side elevational view of a third embodiment of a potato chip lifter according the present invention.
Figure 11:
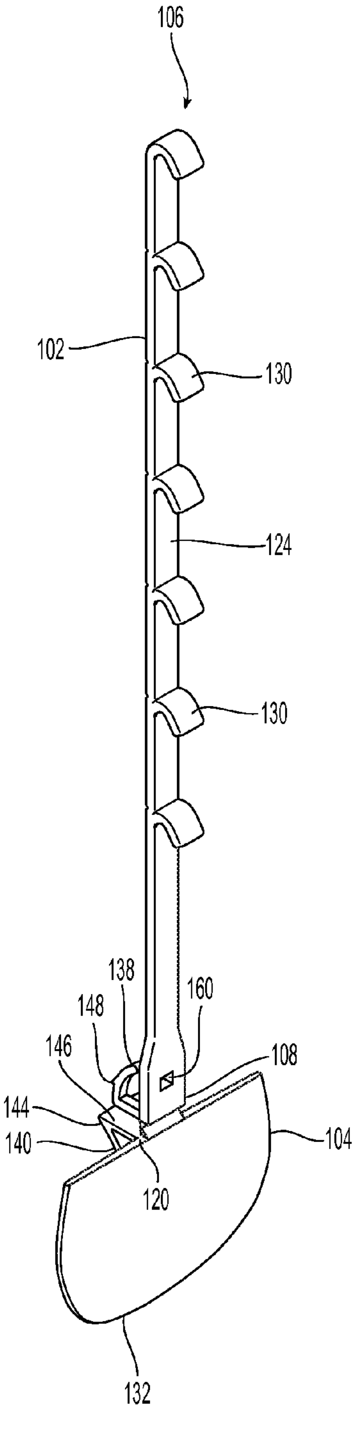
FIG. 11 is a rear perspective view of another embodiment of a potato chip lifter according to the present invention.
Figure 12:
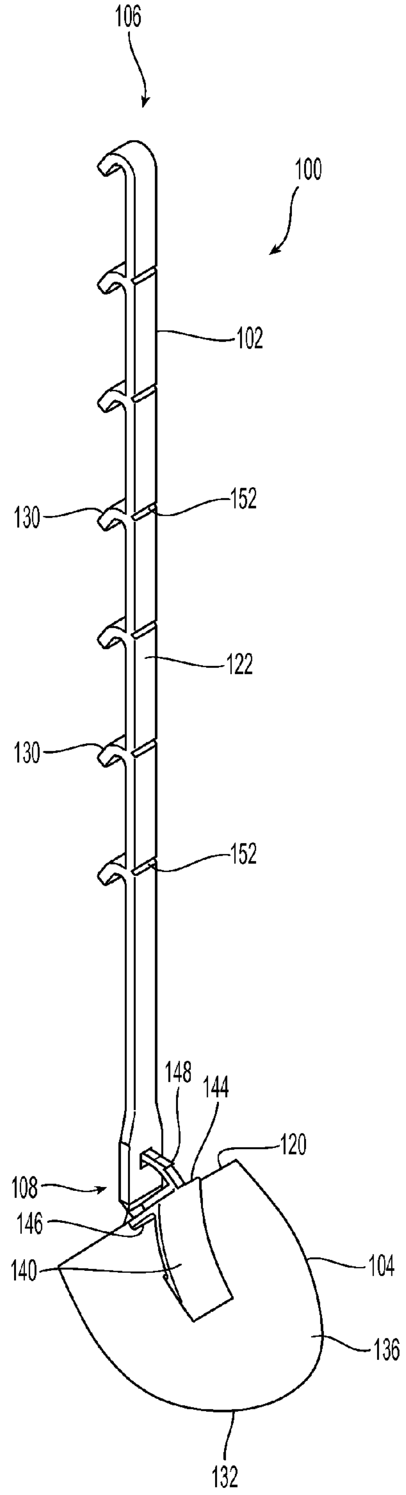
FIG. 12 is a front perspective view of the potato chip lifter of FIG. 11.

FIG. 10 has another embodiment of a potato chip lifter 10" and has an elongated handle 12 and a foot portion 14. The potato chip lifter 10" is similar to the first two embodiments, but has catching mechanisms 30". The catching mechanisms 30" have an inverted configuration, but have a greater angle with the elongated handle 12 and are longer.

Another embodiment of a potato chip lifter 100 is illustrated in FIGS. 11-19. The potato chip lifter 100 is preferably a unitary element that is all formed as a single unit, but it could be made in pieces and connected together, by ultrasonic welding or another technique as is known in the art. The potato chip lifter 100 has an elongated handle 102, which has a top end 106 and a bottom end 108 that connects with the back end 120 of a foot portion 104. The elongated handle 102 also has a front side 122 and a back side 124. Extending from the back side 124 are catching mechanisms 130. The catching mechanisms 130 are preferably spread along the elongated handle 102 at equal spacing. The catching mechanisms 130 are preferably inverted U-shaped members that engage the edge of a potato chip can. See, e.g., FIG. 19. While the catching mechanisms 130 are illustrated as inverted U-shaped members, they may have any relevant shape (as indicated above) and still fall within the scope of the present invention.

Figure 13:
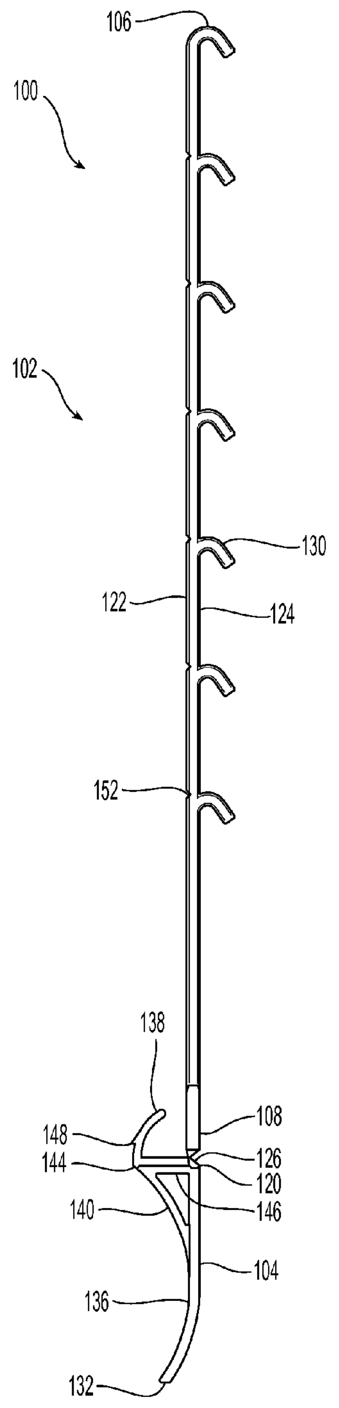
FIG. 13 is a right side elevational view of the potato chip lifter of FIG. 11.
Figure 14:
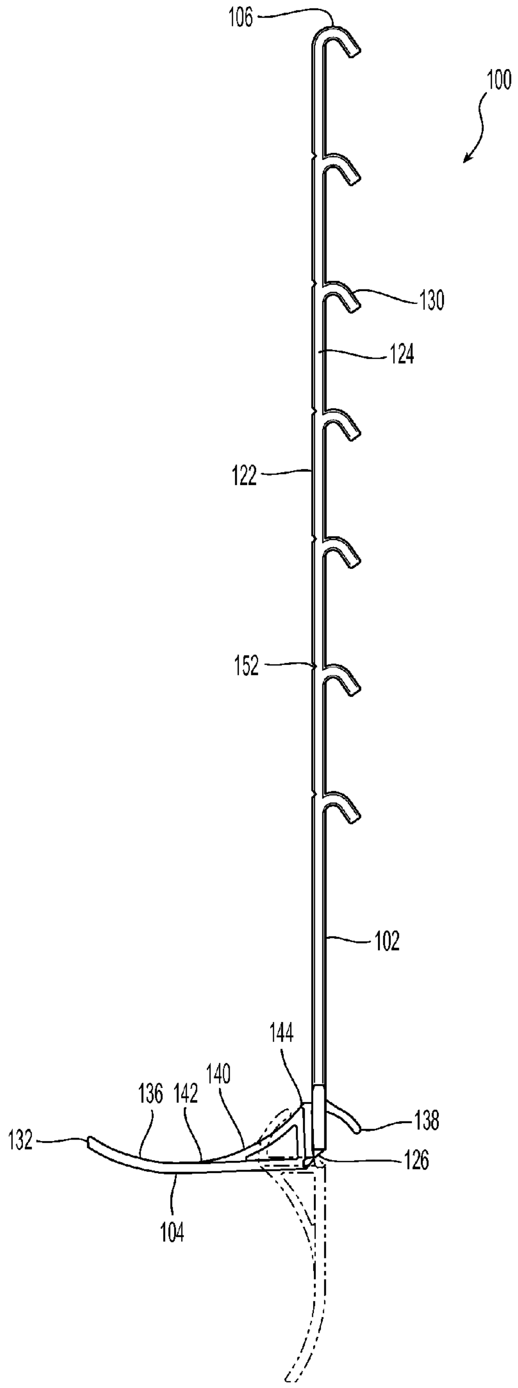
FIG. 14 is a right side elevational view of the potato chip lifter of FIG. 11 with the foot portion in a horizontal position.

The foot portion 104 is attached to the elongated handle 102 at the bottom 108 thereof. The foot portion 104 is preferably a half-circle or spade-shaped member, but can have any appropriate shape, and has a front end 132, a back end 120, and a top surface 136. The front end 132 is preferably curved upward, toward the top surface 136, giving it a concave top surface 136. As described in more detail below, this curvature assists in the rotation of the foot portion 104 relative to the elongated handle 102 when the potato chip lifter 100 is inserted into the potato chip can. The foot portion 104 is preferably attached to the bottom 108 of the elongated handle 102 by a living hinge 126 at the back end 120 of the foot portion 104. The living hinge 126 allows the foot portion 104 to be rotated relative to the elongated handle 102. The potato chip lifter 100 has two configurations, a shipped-in configuration as illustrated in FIG. 13 and a to-be-used configuration as illustrated in FIG. 14. In the shipped-in configuration, the foot portion 104 is at about 180° relative to the elongated handle 102, while in the to-be-used configuration, the foot portion 104 is at about 90° relative to the elongated handle 102. See FIGS. 13 and 14.

The potato chip lifter 100 also has a stability element 140. The stability element 140 has a triangular configuration, similar to stability element 40, but is not permanently connected to the elongated handle 102 in the shipped-in configuration. The front side 142 of the stability element 140 is connected to the top surface 136 of the foot portion 104 and has a upward extending back portion 146 from the back end 120 of the foot portion 104 to connect with the back end 144 of the stability element 140 to make a triangular shape. The foot portion 104 also has a rearwardly extending projection 138, projecting rearwardly from the stability element 140 in a curved arc. The rearwardly extending portion 138 is curved and has a forward facing engaging surface 148. When the foot portion 104 is rotated about 90° relative to the elongated handle 102, the rearwardly extending projection 138 passes through an opening 160 in the elongated handle 102, the opening 160 adjacent the bottom 108 thereof. The forward facing engaging surface 148 passes through the opening 160 and engages the back side 124 of the elongated handle 102. If the user wants to reuse the chip lifter 100, the user can press downward on the projection 138, and push the foot portion 104 back to the original shipped-in position.

The front side 122 of elongated handle 102 has a plurality of thinned areas or scored areas 152. These scored areas 152 provide breaking points for the user if so desired. As can be realized, as the chips are taken from the top of the potato chip stack, and the potato chip stack gets shorter, the user must lift the potato chip lifter 100 out of the can 80. Thus, more of the potato chip lifter 100 will extend above the top edge of the can. See FIG. 19. Because the length of the potato chip lifter 100 may get in the way of the user, the user can break off sections of the elongated handle 102 at the scored areas 152.

Figure 15:
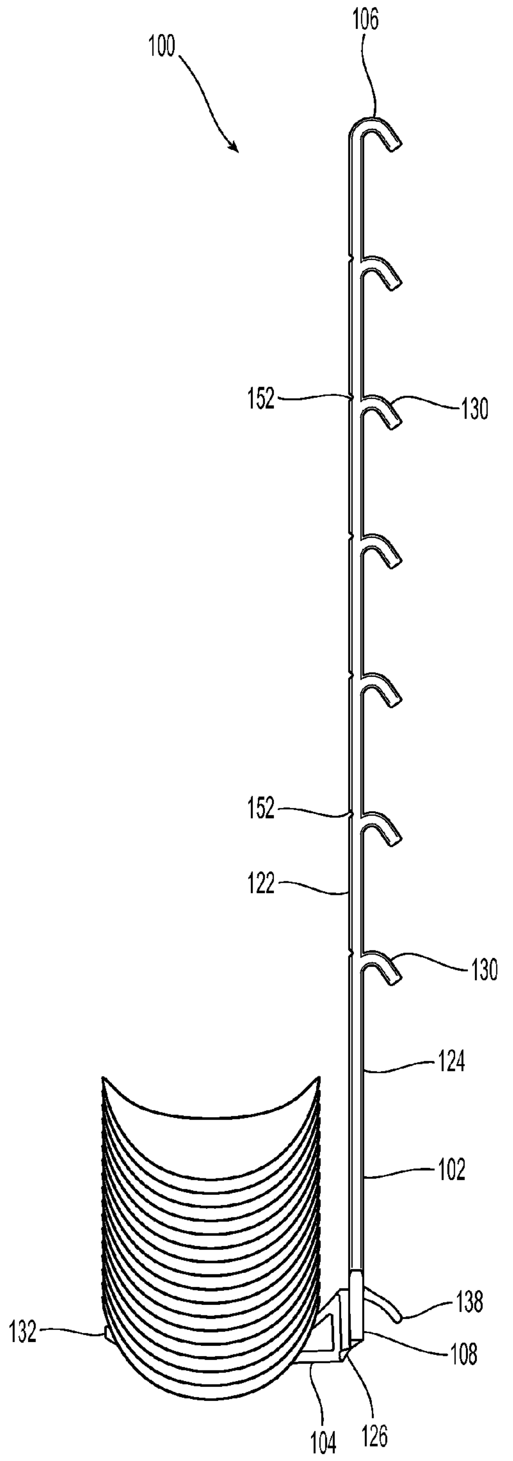
FIG. 15 is right side elevational view of the potato chip lifter of FIG. 14 with some potato chips.

The use of the potato chip lifter is illustrated in FIG. 15, holding a portion of a stack of potato chips in the to-be-used position.

Figure 16:
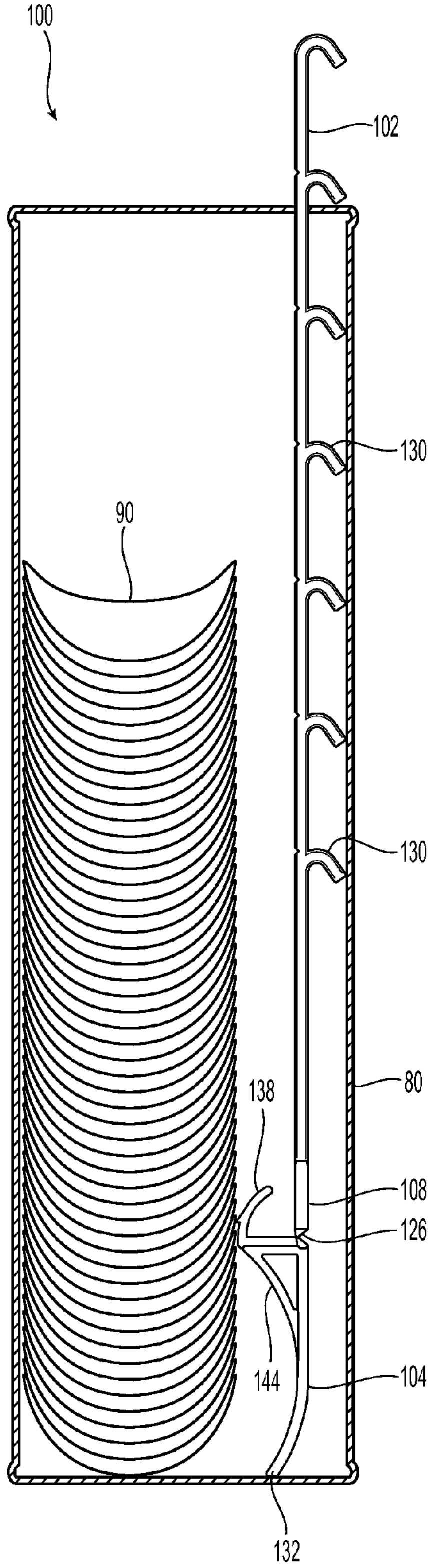
FIG. 16 is a cross section view of the potato chip can with the potato chip lifter in the potato chip can.
Figure 17:
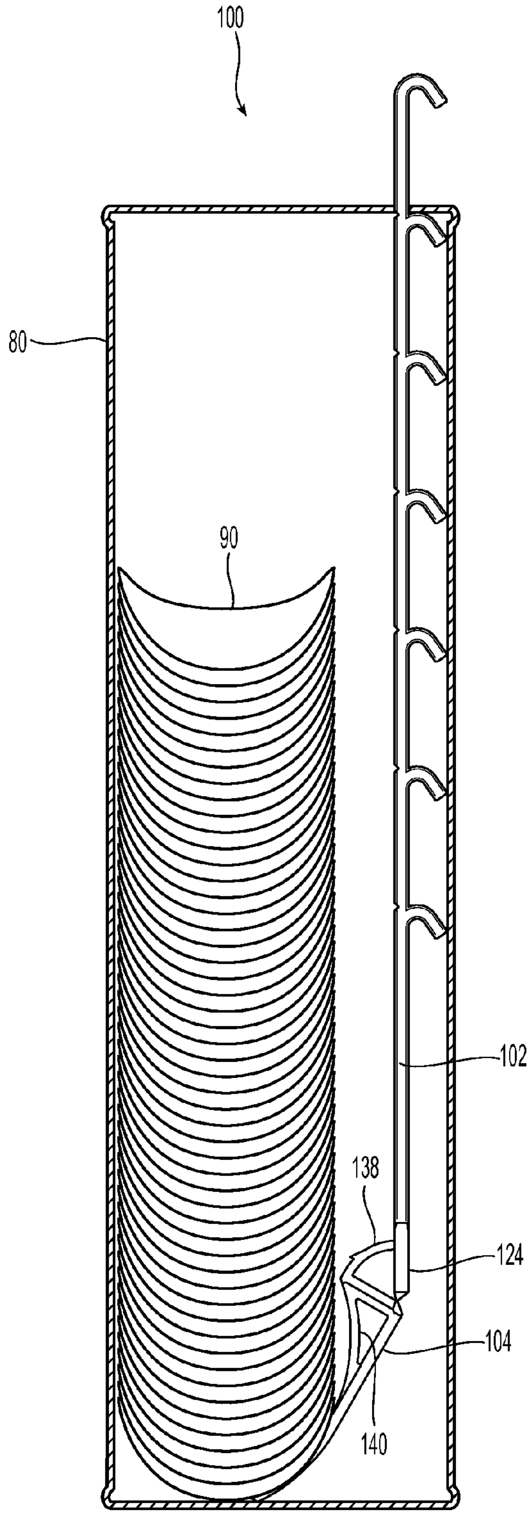
FIG. 17 is a cross section view of the potato chip can with the foot portion of the lifter beginning to move into the horizontal position.
Figure 18:
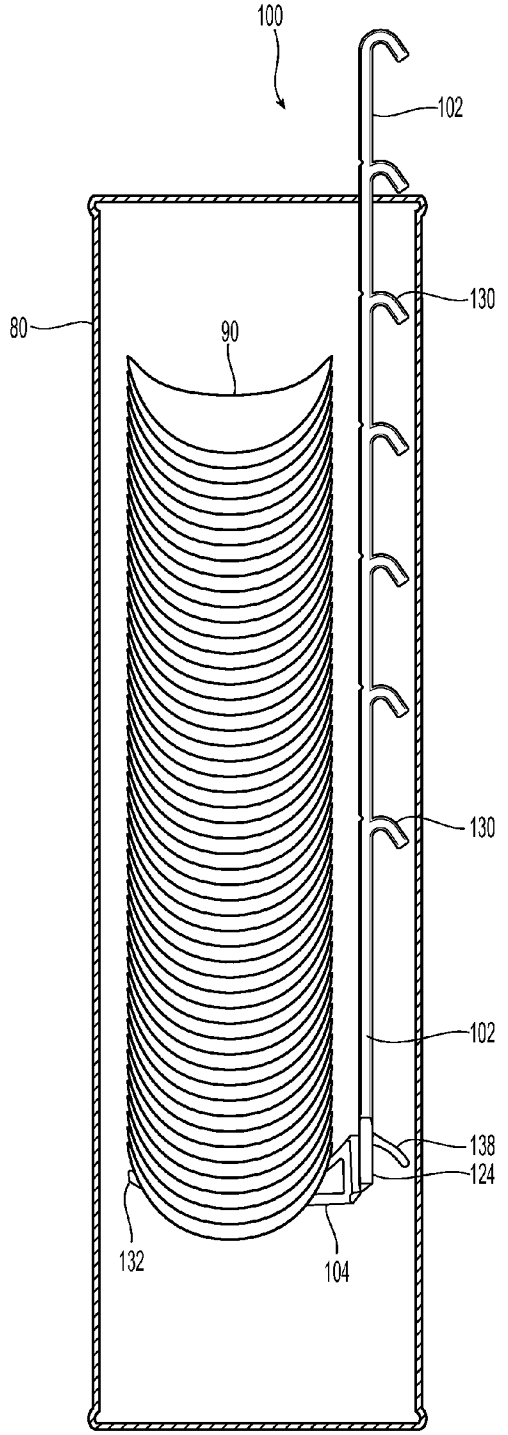
FIG. 18 is a cross section view of the potato chip can with the potato chips being lifted from the potato chip can after the foot portion is secured to the handle portion.
Figure 19:
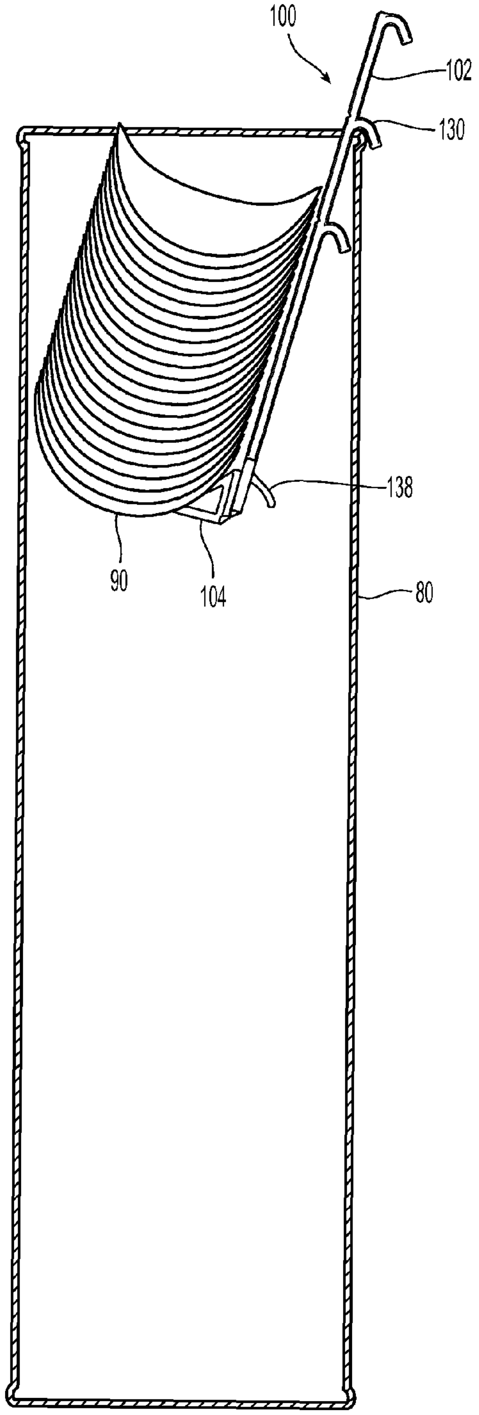
FIG. 19 is a cross section view of of the potato chip lifter in the potato chip can lifting the chips, the catching mechanisms engaging the side of the can, and the chip lifter truncated.
Figure 20:
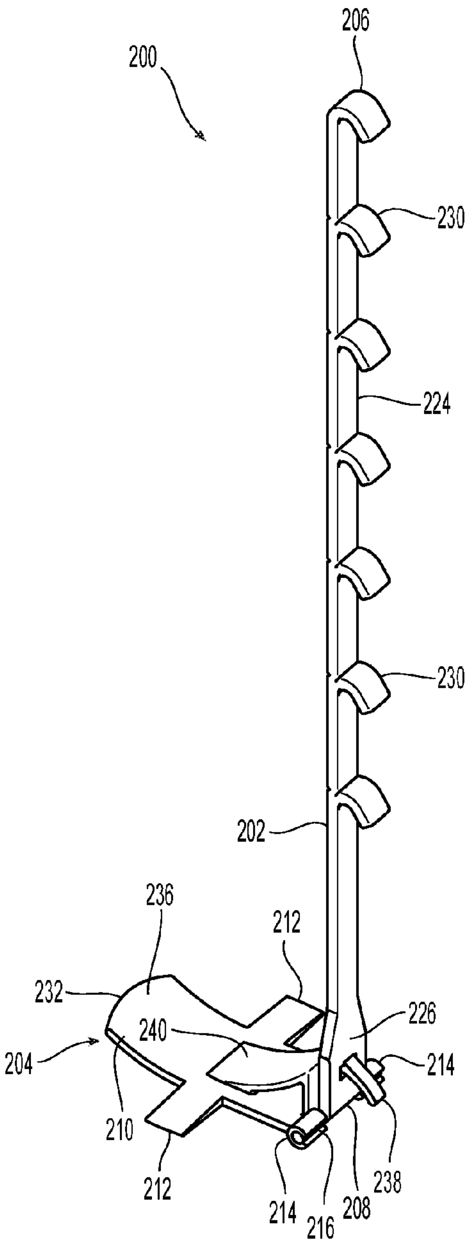
FIG. 20 is a rear perspective view of another embodiment of a potato chip lifter according to the present invention.
Figure 21:
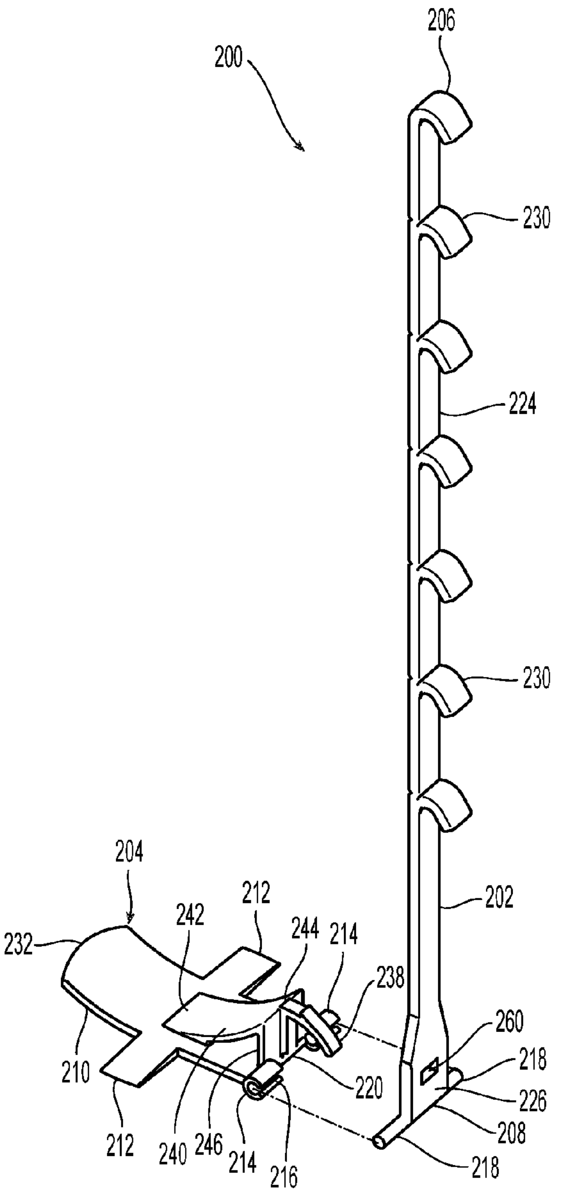
FIG. 21 is an exploded, rear perspective view of the potato chip lifter of FIG. 20.
Figure 22:
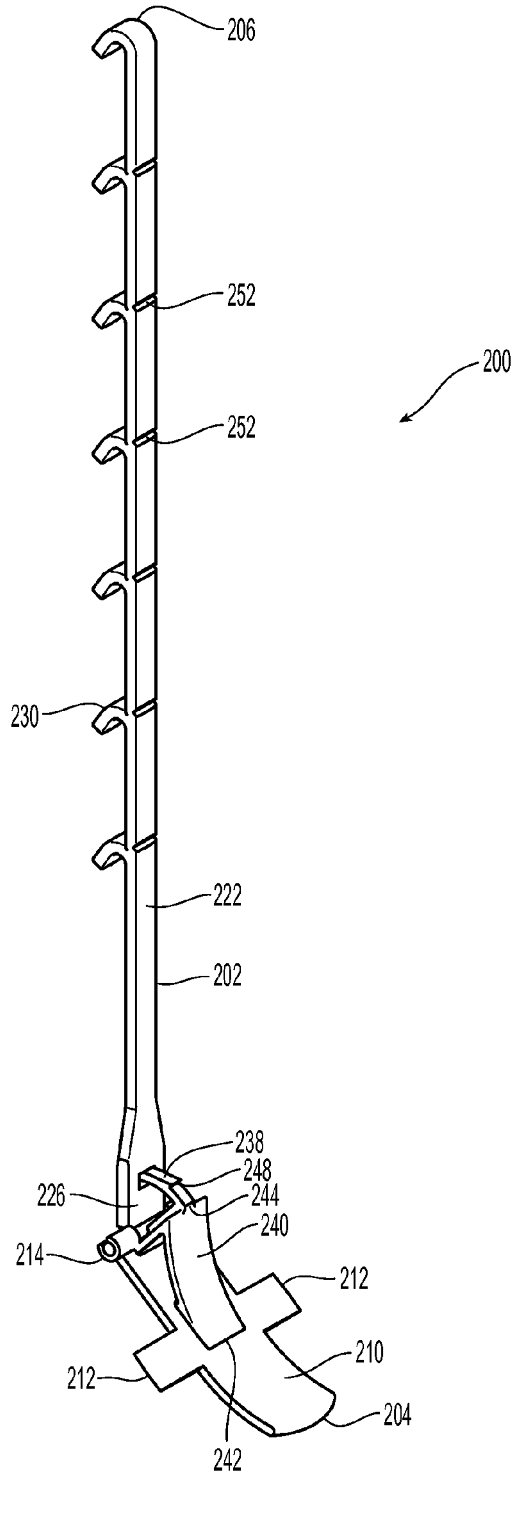
FIG. 22 is a front right perspective view of the potato chip lifter of FIG. 20.

The use of the potato chip lifter 100 will now be described with reference to FIGS. 16-18. In FIG. 16, the stack of potato chips 90 has been moved to one side of the can 80 and the potato chip lifter 100 has been inserted into the can 80. As noted above, it is also possible that the potato chip lifter 100 can be inserted at the factory and before or after the potato chips 90 are inserted. As the potato chip lifter 100 is continued to be pushed into the can 80, the curved portion of the front end 132 of the foot portion 104 causes the foot portion 104 to begin to rotate relative to the elongated handle portion 102 and move under the stack of potato chips 90. See FIG. 17. As the foot portion 104 is rotated relative to the elongated handle portion 102, the rearwardly extending portion 138 is moved into and through the opening 160 and the forward facing engaging surface 148 engages the back side 124 of the elongated handle 102. The potato chips 90 can then be lifted out of the can 80 as illustrated in FIG. 18. As the height of the stack of potato chips 90 is reduced, the length of the elongated handle 102 can also be reduced by bending the elongated handle 102 at the scored areas 152 to break the elongated handle 102.

Another embodiment of a potato chip lifter 200 is illustrated in FIGS. 20-29. The potato chip lifter 200 has an elongated handle 202, which has a top end 206 and a bottom end 208 that connects with the back end 220 of a foot portion 204. The elongated handle 202 also has a front side 222 and a back side 224. Extending from the back side 224 are catching mechanisms 230. The catching mechanisms 230 are preferably spread along the elongated handle 202 at equal spacing, but could spaced in any manner. The catching mechanisms 230 are preferably inverted U-shaped members that engage the edge of a potato chip can. See, e.g., FIG. 29. While the catching mechanisms 230 are illustrated as inverted U-shaped members, they may have any relevant shape (as indicated above) and still fall within the scope of the present invention.

Figure 23:
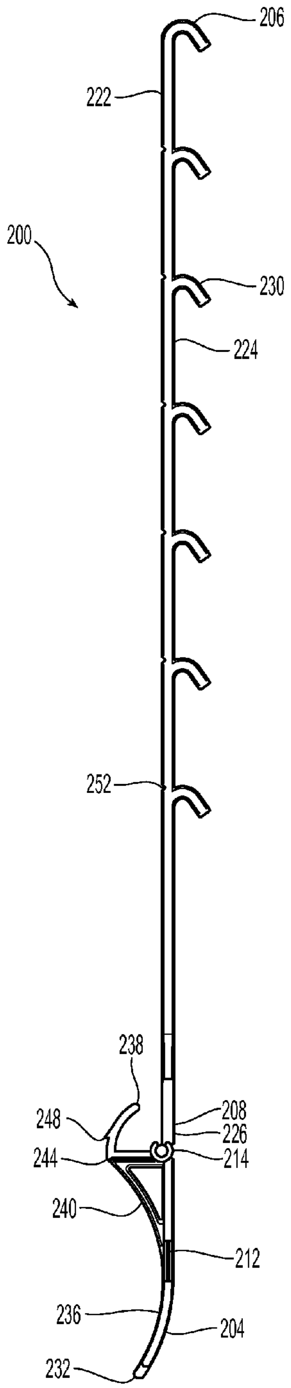
FIG. 23 is a right side elevational view of the potato chip lifter of FIG. 20.
Figure 24:
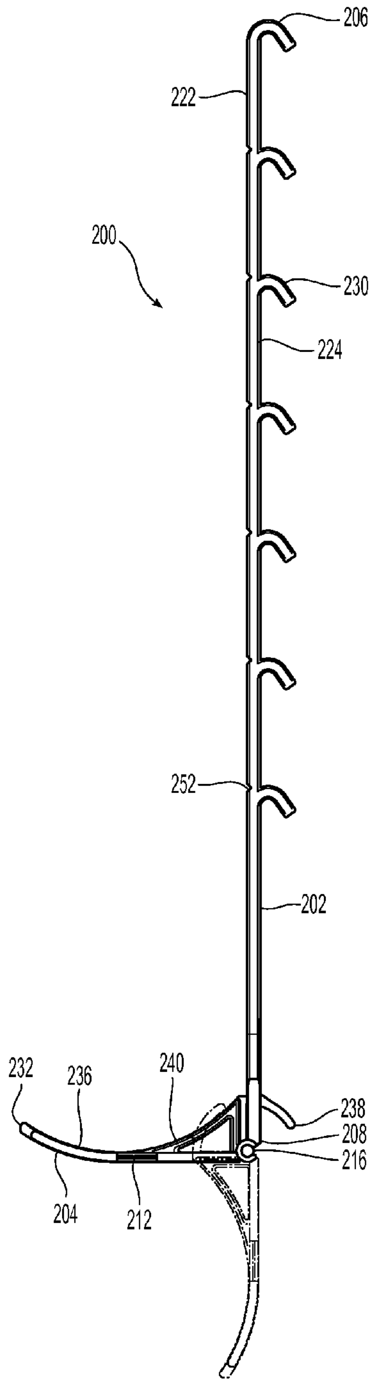
FIG. 24 is a right side elevational view of the potato chip lifter of FIG. 20 with the foot portion in a horizontal position.

The foot portion 204 is attached to the elongated handle 202 at the bottom 208 thereof. The foot portion 204 preferably has a central elongated member 210 and two side members 212, but can have any appropriate shape, including those illustrated above. The foot portion 204 has a front end 232, a back end 220, and a top surface 236. The front end 232 is preferably curved upward, toward the top surface 236, giving it a concave top surface 236. As described in more detail below, this curvature assists in the rotation of the foot portion 204 relative to the elongated handle 202 when the potato chip lifter 200 is inserted into the potato chip can. The foot portion 204 is removably attached to the bottom 208 of the elongated handle 202. By removably attached, Applicant means that the foot portion 204 can be removed from the elongated handle 202 multiple times without any destruction of either portion. Additionally, Applicant means that the two components can be and are meant to be attached and unattached from one another. The foot portion 204 has two cylindrical members 214 at the back end 220 that have an opening 216 along the length thereof to receive the cylindrical extensions 218 on the bottom end 208 of the elongated handle 202. The elongated handle 202 has, at the bottom end 208, a central portion 226 from which the cylindrical extensions 218 extend. As illustrated, the cylindrical extensions 218 extend away from the elongated handle 202 and also from one another. The cylindrical extensions 218 are also preferably sized so that they are as wide as central portion 226 and are therefore between the front side 222 and the back side 224. However, depending on the material used, they could be larger or smaller than the thickness of the elongated handle 202. The combination of the cylindrical extensions 218 and the cylindrical members 214 allows the foot portion 204 to be rotated relative to the elongated handle 202. The potato chip lifter 200 has two configurations, a shipped-in configuration as illustrated in FIG. 23 and a to-be-used configuration as illustrated in FIG. 24. In the shipped-in configuration, the foot portion 204 is at about 180° relative to the elongated handle 202, while in the to-be-used configuration, the foot portion 204 is at about 90° relative to the elongated handle 102. See FIGS. 23 and 24.

While the opening 216 is illustrated as opening away from the foot portion 204, it may also face downward and away from the top surface 236.

The potato chip lifter 200 also has a stability element 240. The stability element 240 has a triangular configuration but is not permanently connected to the elongated handle 202. The front side 242 of the stability element 240 is connected to the top surface 236 of the foot portion 204 and has a upward extending back portion 246 from the back end 220 of the foot portion 204 to connect with the back end 244 of the stability element 240 to make a generally triangular shape. The foot portion 204 also has a rearwardly extending projection 238, projecting rearwardly from the stability element 240 in a curved arc. The rearwardly extending portion 238 is curved and has a forward facing engaging surface 248. When the foot portion 204 is rotated about 90° relative to the elongated handle 202, the rearwardly extending projection 238 passes through an opening 260 in the elongated handle 202, the opening 260 adjacent the bottom 208 thereof. The forward facing engaging surface 248 passes through the opening 260 and engages the back side 224 of the elongated handle 202. If the user wants to reuse the chip lifter 200, the user can press downward on the projection 238, and push the foot portion 204 back to the original shipped-in position. It is also possible to ship the potato chip lifter 200 with the foot portion 204 removed from the elongated handle 202 and the foot portion 204 can be attached to the elongated handle 202 at receipt of the parts or at any time before use.

The front side 222 of elongated handle 202 has a plurality of thinned areas or scored areas 252. These scored areas 252 provide breaking points for the user if so desired. As can be realized, as the chips are taken from the top of the potato chip stack, and the potato chip stack gets shorter, the user must lift the potato chip lifter 200 out of the can 80 to reach the potato chips. Thus, more of the potato chip lifter 200 will extend above the top edge of the can. See FIG. 29. Because the length of the potato chip lifter 100 may get in the way of the user, the user can break off sections of the elongated handle 202 at the scored areas 252.

Figure 25:
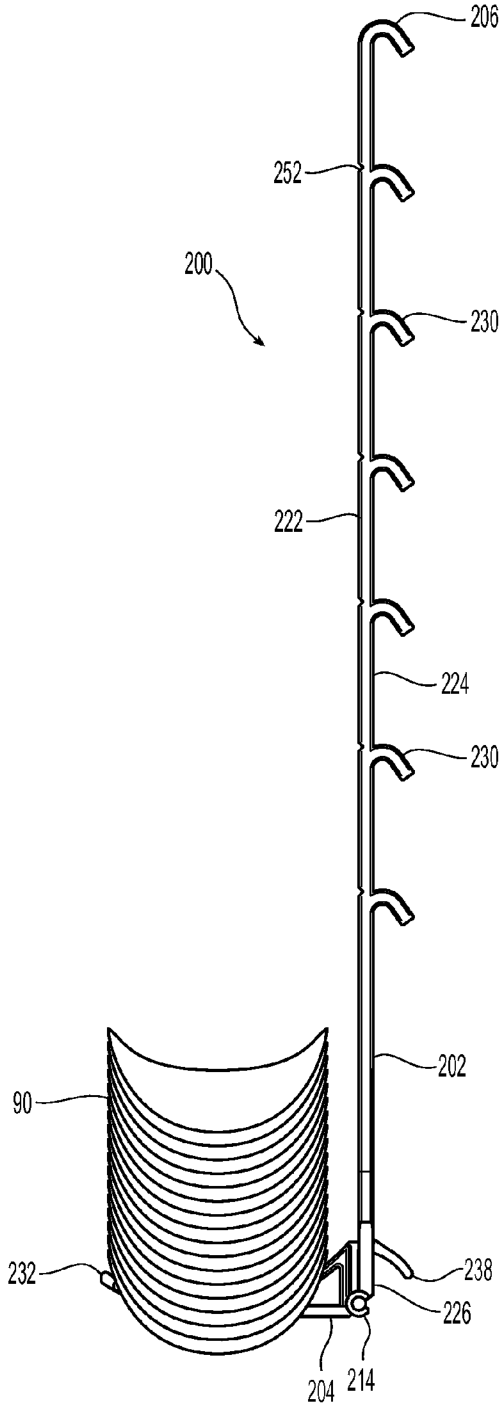
FIG. 25 is right side elevational view of the potato chip lifter of FIG. 20 with some potato chips.

The use of the potato chip lifter is illustrated in FIG. 25, holding a portion of a stack of potato chips in the to-be-used position.

Figure 26:
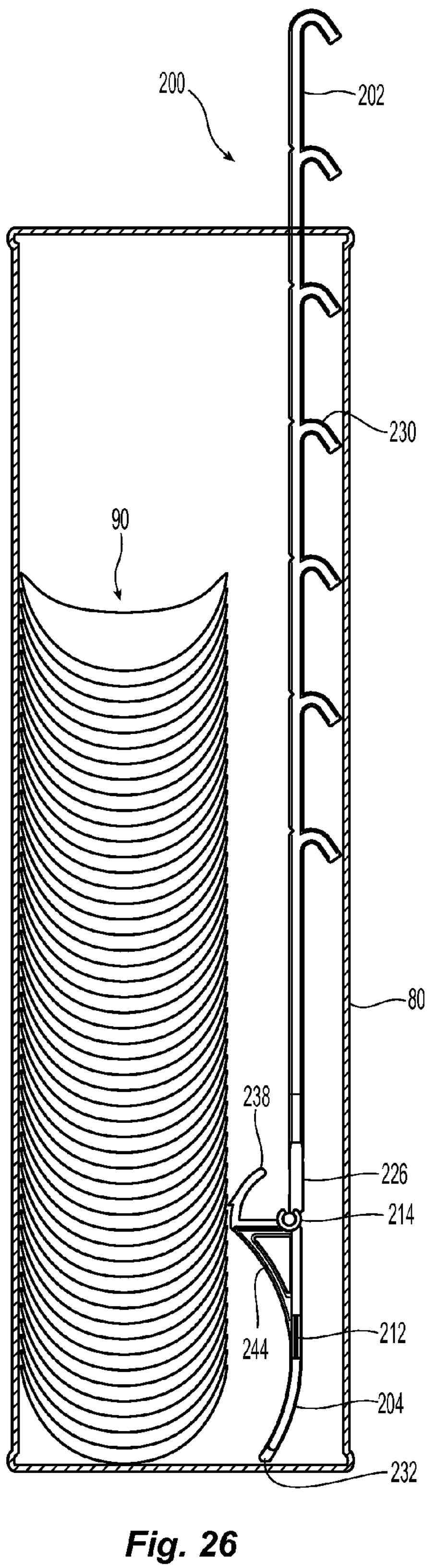
FIG. 26 is a cross section view of the potato chip can with the potato chip lifter in the potato chip can.
Figure 27:
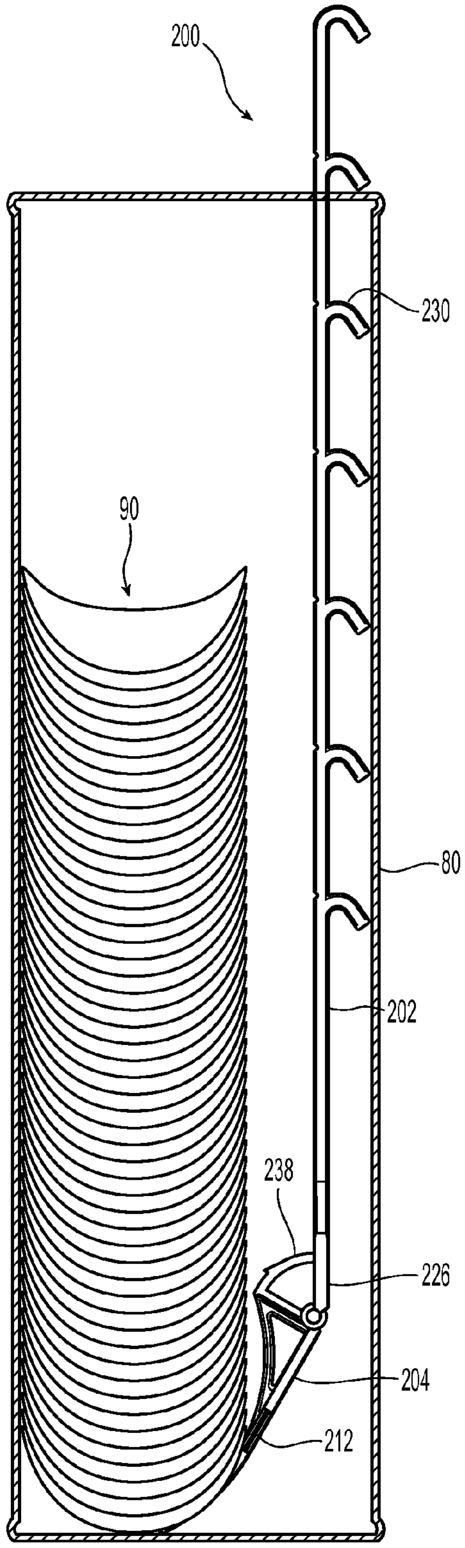
FIG. 27 is a cross section view of the potato chip can with the foot portion of the lifter beginning to move into the horizontal position.
Figure 28:
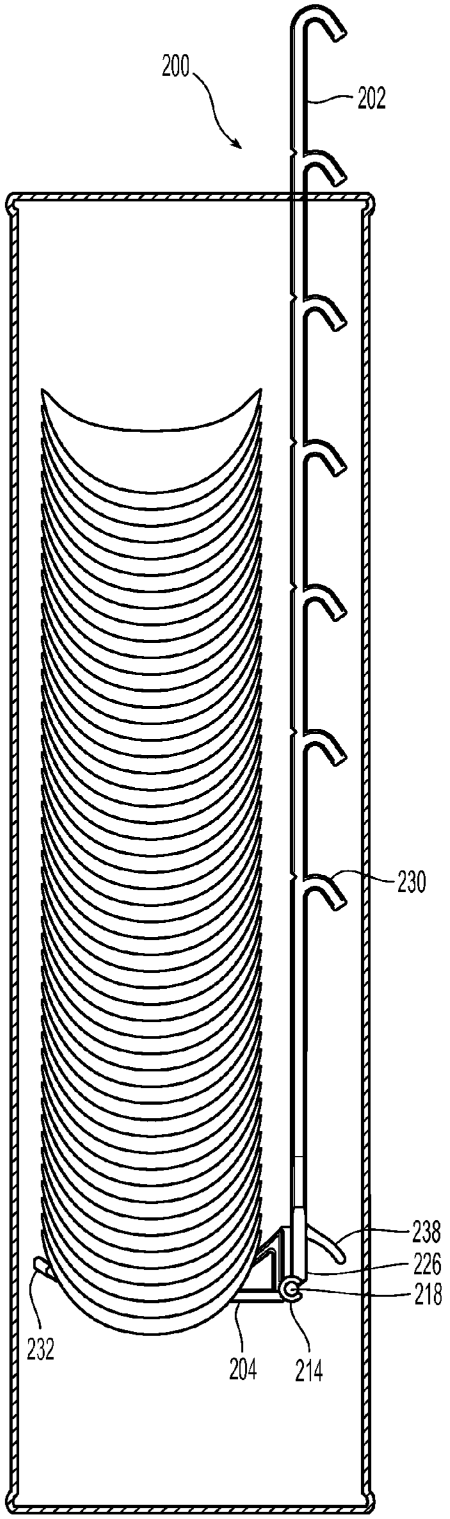
FIG. 28 is a cross section view of the potato chip can with the potato chips being lifted from the potato chip can after the foot portion is secured to the handle portion.
Figure 29:
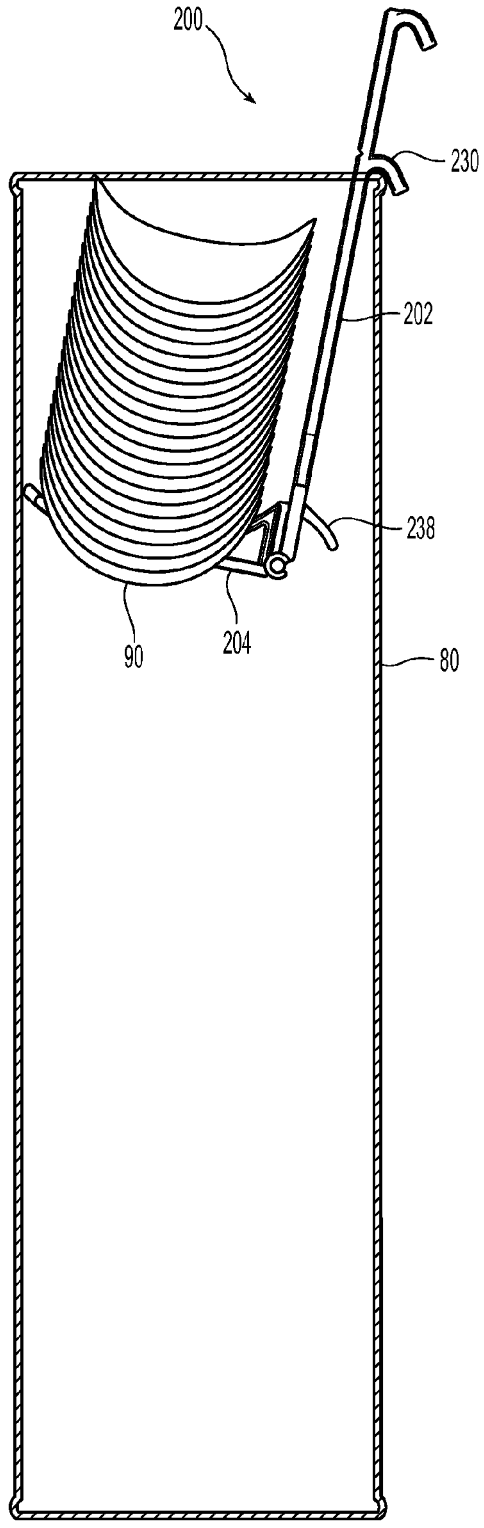
FIG. 29 is a cross section view of the potato chip lifter in the potato chip can lifting the chips, the catching mechanisms engaging the side of the can, and the chip lifter truncated.

The use of the potato chip lifter 200 will now be described with reference to FIGS. 26-29. In FIG. 26, the stack of potato chips 90 has been moved to one side of the can 80 and the foot portion 204 has been attached to the elongated handle 202 and is in the shipped-in configuration. The potato chip lifter 200 has been inserted into the can 80. As noted above, it is also possible that the potato chip lifter 200 can be inserted at the factory and before or after the potato chips 90 are inserted. As the potato chip lifter 200 is continued to be pushed into the can 80, the curved portion of the front end 232 of the foot portion 204 causes the foot portion 204 to begin to rotate relative to the elongated handle portion 202 and move under the stack of potato chips 90. See FIG. 27. As the foot portion 204 is rotated relative to the elongated handle portion 202, the rearwardly extending portion 238 is moved into and through the opening 260 and the forward facing engaging surface 248 engages the back side 224 of the elongated handle 202. The potato chips 90 can then be lifted out of the can 80 as illustrated in FIG. 28. As the height of the stack of potato chips 90 is reduced, the length of the elongated handle 102 can also be reduced by bending the elongated handle 202 at the scored areas 252 to break the elongated handle 202. See FIG. 29.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A potato chip lifting apparatus comprising:

an elongated handle, the elongated handle having a front side and a back side, the back side having a plurality of catching mechanisms extending from the back side of the elongated handle and away from the elongated handle, the plurality of catching mechanisms configured to engage a can in which potato chips are stored;

a foot portion removably attached to a bottom portion of the elongated handle, the foot portion movable between a first position and a second position, in the second position the foot portion extends in a direction away from the front side of the handle and generally orthogonal to the elongated handle and the front side thereof; and a projection disposed on the foot portion and extending rearwardly therefrom, the projection engaging an opening in the elongated handle in the second position.

2. The potato chip lifting apparatus according to claim 1, wherein the bottom portion of the elongated handle has a central portion and two extensions attached to the central portion and projecting away from one another and configured to engage the foot portion.

3. The potato chip lifting apparatus according to claim 2, wherein each of the two extensions project outwardly from each side of the central portion and between the front and back side.

4. The potato chip lifting apparatus according to claim 2, the foot portion having a front end and a back end, the back end of the foot portion having receptacles to rotatably receive the two extensions attached to the central portion of the elongated handle.

5. The potato chip lifting apparatus according to claim 1, further comprising a stability element, the stability element connected to the foot portion and engaging the front side of the elongated handle in the second position.

6. The potato chip lifting apparatus according to claim 5, wherein the stability element has a generally concave shape.

7. The potato chip lifting apparatus according to claim 1, wherein the elongated handle and the foot portion are disposed at about a 90° angle in the second position.

8. The potato chip lifting apparatus according to claim 1, wherein the elongated handle has a plurality of thinned areas along its length to provide breaking points.

9. The potato chip lifting apparatus according to claim 1, wherein the handle and the foot portion fit between a side wall of a can in which potato chips are stored and a stack of potato chips disposed in the can.

10. The potato chip lifting apparatus according to claim 1, wherein the foot portion can be rotated relative to a stack of potato chips in a can, the foot portion disposed transverse to the potato chips.

11. A potato chip lifting apparatus comprising:

an elongated handle having a front side and a back side;

a foot portion having a front end and a back end, the back end of the foot portion removably connected to a bottom portion of the elongated handle, the foot portion rotatable between a first position and a second position, in the second position the foot portion extends in a direction away from the front side of the handle and generally orthogonal to the elongated handle and the front side thereof; and a projection disposed on the foot portion and extending rearwardly therefrom, the projection having a forward facing engaging surface, the forward facing engaging surface of the projection engaging the back side of the elongated handle in the second position.

12. The potato chip lifting apparatus according to claim 11, further comprising a plurality of catching mechanisms disposed along the back side and extending from the back side of the elongated handle and away from the elongated handle, the plurality of catching mechanisms configured to engage a can in which potato chips are stored.

13. The potato chip lifting apparatus according to claim 11, further comprising a stability element, the stability element connected to the foot portion and adjacent to the front side of the elongated handle in the second position.

14. The potato chip lifting apparatus according to claim 13, wherein the projection extends rearwardly from the stability element.

15. The potato chip lifting apparatus according to claim 11, wherein the elongated handle and the foot portion are disposed at about a 90° angle in the second position.

16. The potato chip lifting apparatus according to claim 11, wherein the projection is curved.

17. The potato chip lifting apparatus according to claim 11, wherein a portion of the projection passes through an opening in the elongated handle.

18. The potato chip lifting apparatus according to claim 11, wherein the elongated handle has a plurality of thinned areas along its length to provide breaking points.

19. A potato chip lifting apparatus comprising:

an elongated handle, the elongated handle having a front side and a back side, the back side having a plurality of catching mechanisms extending from the back side of the elongated handle and away from the elongated handle, the plurality of catching mechanisms configured to engage a can in which potato chips are stored;

two extensions attached to a central portion of the elongated handle at a bottom portion thereof and projecting away from one another; and a foot portion having a front end and a back end, the back end of the foot portion having receptacles to removably receive the two extensions attached to the central portion of the elongated handle, the foot portion movable between a first position and a second position, in the second position the foot portion extends in a direction away from the front side of the handle and generally orthogonal to the elongated handle and the front side thereof.

* * * * *